(12) United States Patent
Terry et al.

(10) Patent No.: US 10,689,089 B2
(45) Date of Patent: Jun. 23, 2020

(54) ENTRY HANDLE FOR AN AIRCRAFT DOORWAY

(71) Applicant: Textron Aviation Inc., Wichita, KS (US)

(72) Inventors: James D. Terry, Wichita, KS (US); Rodd William Fuller, Valley Center, KS (US)

(73) Assignee: Textron Innovations, Inc., Providence, RI (US)

( * ) Notice: Subject to any disclaimer, the term of this patent is extended or adjusted under 35 U.S.C. 154(b) by 482 days.

(21) Appl. No.: 15/468,650

(22) Filed: Mar. 24, 2017

(65) Prior Publication Data
US 2017/0283030 A1   Oct. 5, 2017

Related U.S. Application Data

(60) Provisional application No. 62/317,091, filed on Apr. 1, 2016.

(51) Int. Cl.
| | |
|---|---|
| *B64C 1/14* | (2006.01) |
| *E05B 1/00* | (2006.01) |
| *B64C 1/24* | (2006.01) |
| *B64F 1/30* | (2006.01) |

(52) U.S. Cl.
CPC .......... *B64C 1/1461* (2013.01); *B64C 1/1423* (2013.01); *B64C 1/24* (2013.01); *B64F 1/30* (2013.01); *E05B 1/0015* (2013.01); *E05B 1/0053* (2013.01)

(58) Field of Classification Search
CPC ....... B64C 1/1461; B64C 1/1423; B64C 1/24; B64C 1/1407; B64C 1/1415; E05B 1/0015; E05B 1/0053; E05Y 2900/502; B64F 1/30
See application file for complete search history.

(56) References Cited

U.S. PATENT DOCUMENTS

| | | | | |
|---|---|---|---|---|
| 3,647,169 A | * | 3/1972 | Allwright | B64C 1/1407 244/129.5 |
| 3,718,171 A | * | 2/1973 | Godwin | B64C 1/1415 160/210 |
| 4,125,235 A | * | 11/1978 | Fitzgerald | B64C 1/143 244/129.5 |

(Continued)

*Primary Examiner* — Assres H Woldemaryam
(74) *Attorney, Agent, or Firm* — Erise IP, P.A.

(57) ABSTRACT

Embodiments of the present disclosure provide an entry assist system for an aircraft doorway. The system includes a securement member configured to be secured into at least one aperture of the doorway, a handle portion pivotally attached to the securement member, and a releasable locking feature for locking the handle portion. A mounting device is used for securing the stationary member to an existing aperture in the doorway and for removing the entry assist system when no longer needed. The securement member forms a stationary portion along an inner edge of the doorway. The handle portion includes a hub configured for rotating about an axle that is coupled to an interface of the securement member. The hub and interface interconnect to form the releasable locking feature for locking the handle in a collapsed position adjacent the securement member or in an extended position protruding outside the doorway.

10 Claims, 18 Drawing Sheets

(56) References Cited

U.S. PATENT DOCUMENTS

| | | | | |
|---|---|---|---|---|
| 4,470,566 A | * | 9/1984 | Fitzgerald | B64C 1/1407 244/129.1 |
| 4,560,123 A | * | 12/1985 | Sealey | B64C 1/143 244/129.5 |
| 4,944,473 A | * | 7/1990 | Kallies | B64C 1/1407 244/129.5 |
| 5,267,438 A | * | 12/1993 | Bunel | F02K 1/70 239/265.29 |
| 5,318,333 A | * | 6/1994 | Dreifert | E05C 9/02 292/336.3 |
| 6,145,301 A | * | 11/2000 | Gonidec | F02K 1/68 239/265.27 |
| 6,349,901 B1 | * | 2/2002 | Grossman | B64C 25/14 244/102 R |
| 8,672,271 B2 | * | 3/2014 | Gorgoglione | B64C 1/1407 244/129.5 |
| 2007/0252386 A1 | * | 11/2007 | Cress | F16L 37/248 285/209 |
| 2009/0108133 A1 | * | 4/2009 | Clausen | B64C 1/1407 244/129.1 |
| 2012/0032028 A1 | * | 2/2012 | Pritzen | B64C 1/1407 244/129.5 |
| 2014/0138488 A1 | * | 5/2014 | Berthoud | B64C 1/1407 244/129.5 |
| 2014/0237899 A1 | * | 8/2014 | Felmeri | A47K 3/36 49/168 |

\* cited by examiner

ENTRY HANDLE FOR AN AIRCRAFT DOORWAY

CROSS-REFERENCE TO RELATED APPLICATIONS

This application claims priority to U.S. Patent Application 62/317,091, filed Apr. 1, 2016, the disclosure of which is incorporated herein by reference.

BACKGROUND

1. Field

Embodiments of this disclosure relate generally to the field of providing entry assistance through a door, and more specifically to providing a removable handle for assisting a passenger entering a door on an aircraft.

2. Description of the Related Art

Many smaller aircraft are not normally equipped from the factory with a hand rail to assist in entering the aircraft. This is very typical on aircraft that have a separate door and fold out stairs instead of a combined "airstair" type assembly.

Handrails have been provided in a variety of ways in prior art aircraft. For example, U.S. Pat. No. 5,143,324 to Cornelius et al. discloses a handrail with telescoping segments for aircraft cabin stairs. U.S. Pat. No. 2,453,937 to Ray discloses an aircraft door having handrails. U.S. Pat. No. 9,469,389 to Heinen discloses an aircraft boarding handrail that is securable inside a cabin door.

U.S. Patent Publication 2014/0264221 to Boren discloses a handrail apparatus for use with vehicles but not for staircases. U.S. Pat. No. 7,677,494 to Yada et al. discloses a handrail that is pivotally supported through a fulcrum pin by a bracket provided at the opening of the door. U.S. Pat. No. 2,910,255 to Johnson discloses a stair door with a pair of handrails. U.S. Pat. No. 2,812,528 to Odell discloses a handrail for an extensible stairway.

SUMMARY

In an embodiment, an entry assist system is provided for an aircraft doorway that has at least one aperture. The system includes a securement member configured to be secured into the at least one aperture; a handle portion pivotally attached to the securement member for pivoting between an extended position and a collapsed position; and, a releasable locking feature for locking the handle portion in one of the extended position or the collapsed position.

In another embodiment, a removable handle for an aircraft doorway is provided. The removable handle includes a stationary member for mounting along an inner edge of the aircraft doorway; a mounting device configured for removably securing the stationary member to an existing aperture in the aircraft doorway; and, a pivoting member having a hub configured for rotating about an axle, wherein the axle is coupled to an interface of the stationary member such that the pivoting member pivots about the axle between a collapsed position adjacent the stationary member and an extended position protruding outside the aircraft doorway.

In yet another embodiment, an entry handle for an aircraft doorway is provided. The entry handle includes a stationary member having an axle housed in an interface, the stationary member being removably secured to the aircraft doorway via a first mounting device coupled to a first aperture of the aircraft doorway and a second mounting device coupled to a second aperture of the aircraft doorway; and, a pivoting member having a hub configured to receive the axle such that the pivoting member may pivot about the axle from a collapsed position to an extended position.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure provide a temporary hand held rail that can be attached to the aircraft for entry, and then removed and stowed during flight.

Figure 1:
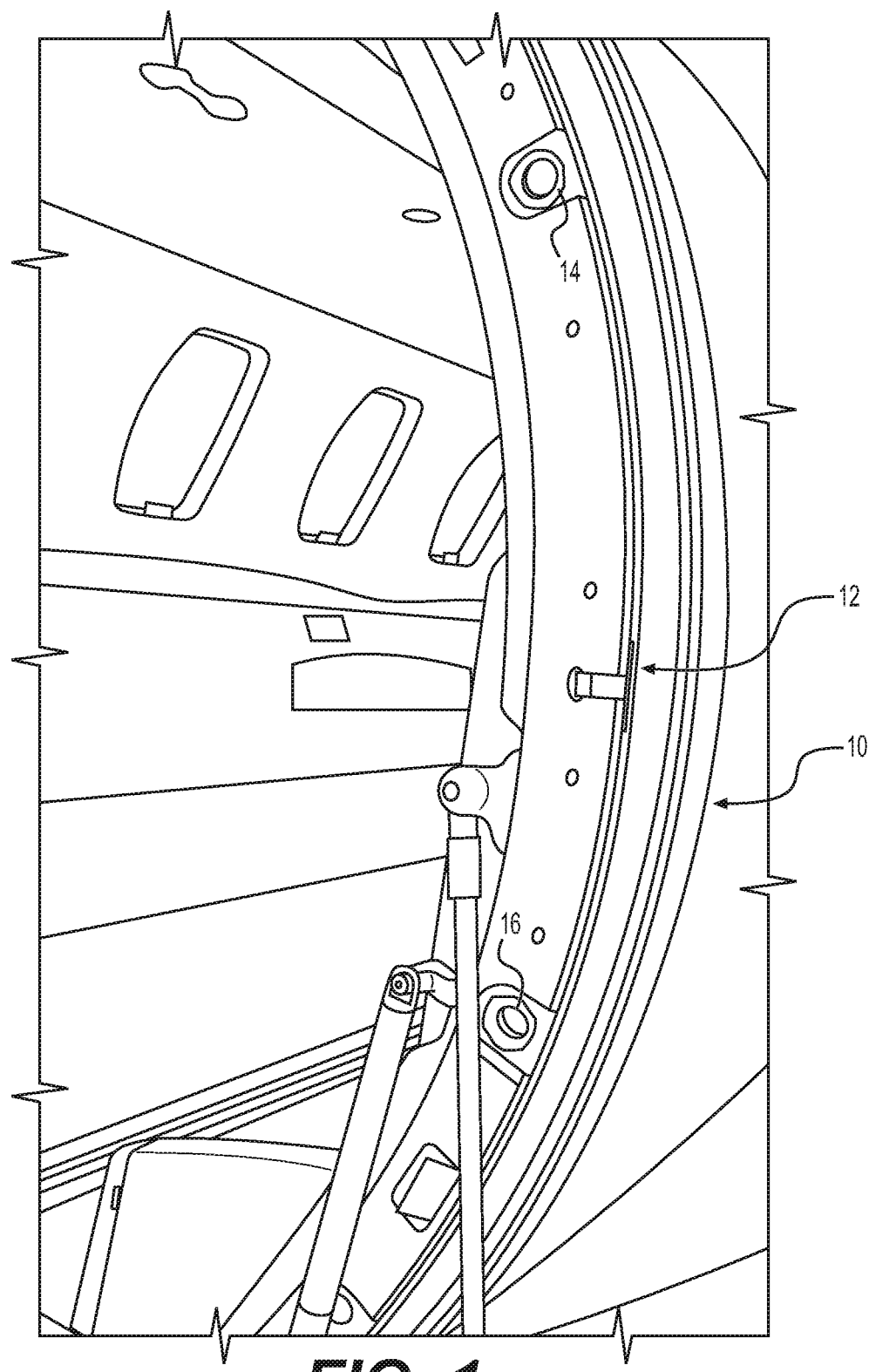
FIG. 1 is a perspective view of an aircraft door entry way frame prior to installation of a handle system.

FIG. 1 shows a conventional entry way door frame 10 of an aircraft. As can be seen in FIG. 1, an inner edge 12 of door frame 10 includes an upper aperture 14 and a lower aperture 16. Those skilled in the art will recognize that these apertures (also called sockets) typically have a substantially cylindrical shape, and when the door latching mechanism is actuated, the apertures receive pins that extend from the door for securing the door. FIG. 1, however, shows the door as it exists in its open state. When the door is open, upper aperture 14 and lower aperture 16 are exposed, and are utilized in an embodiment herein.

Figure 2:
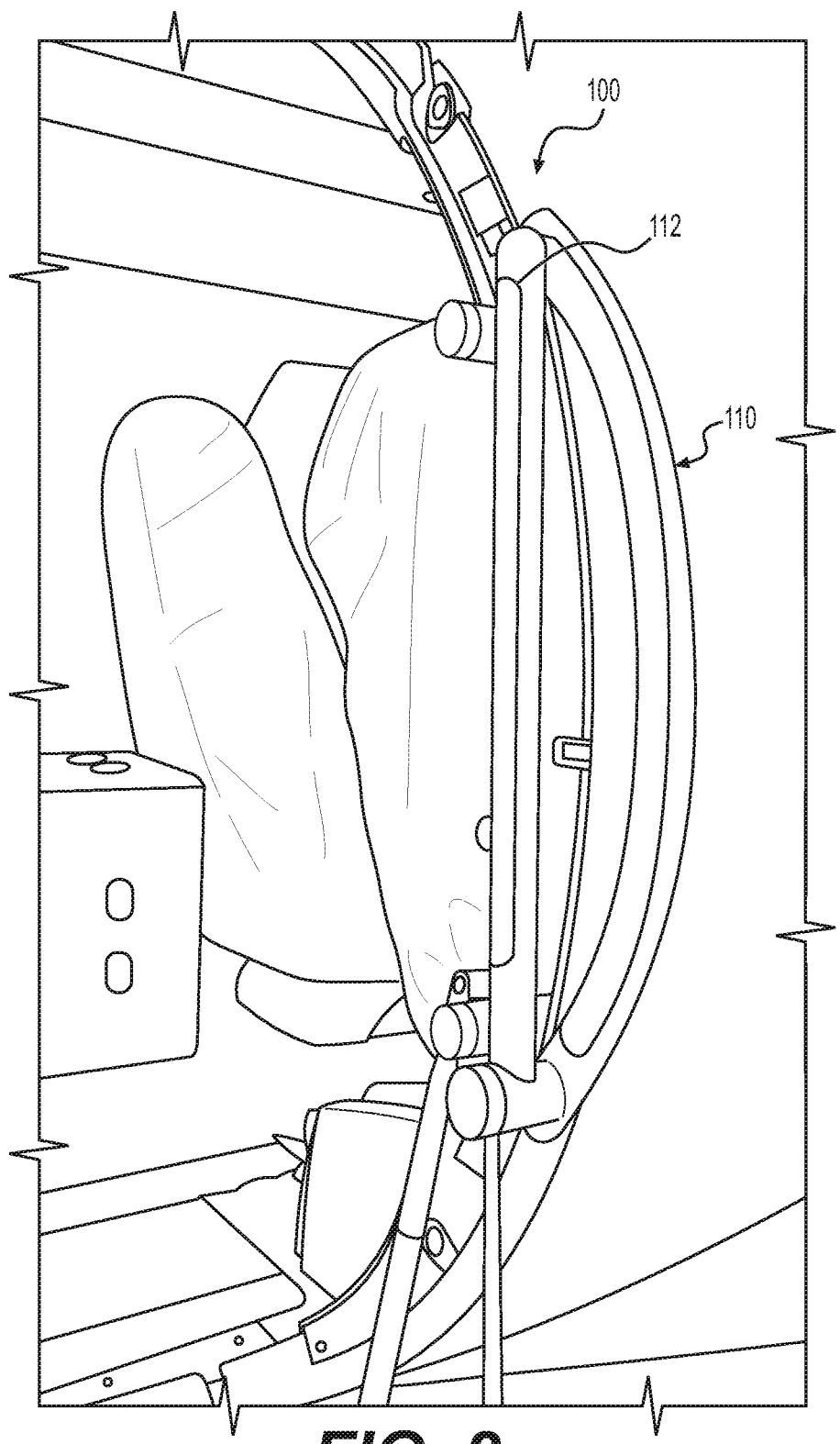
FIG. 2 is a perspective view of an aircraft door frame in which the handle system has been installed, and the handle is in an upright collapsed position.
Figure 3:
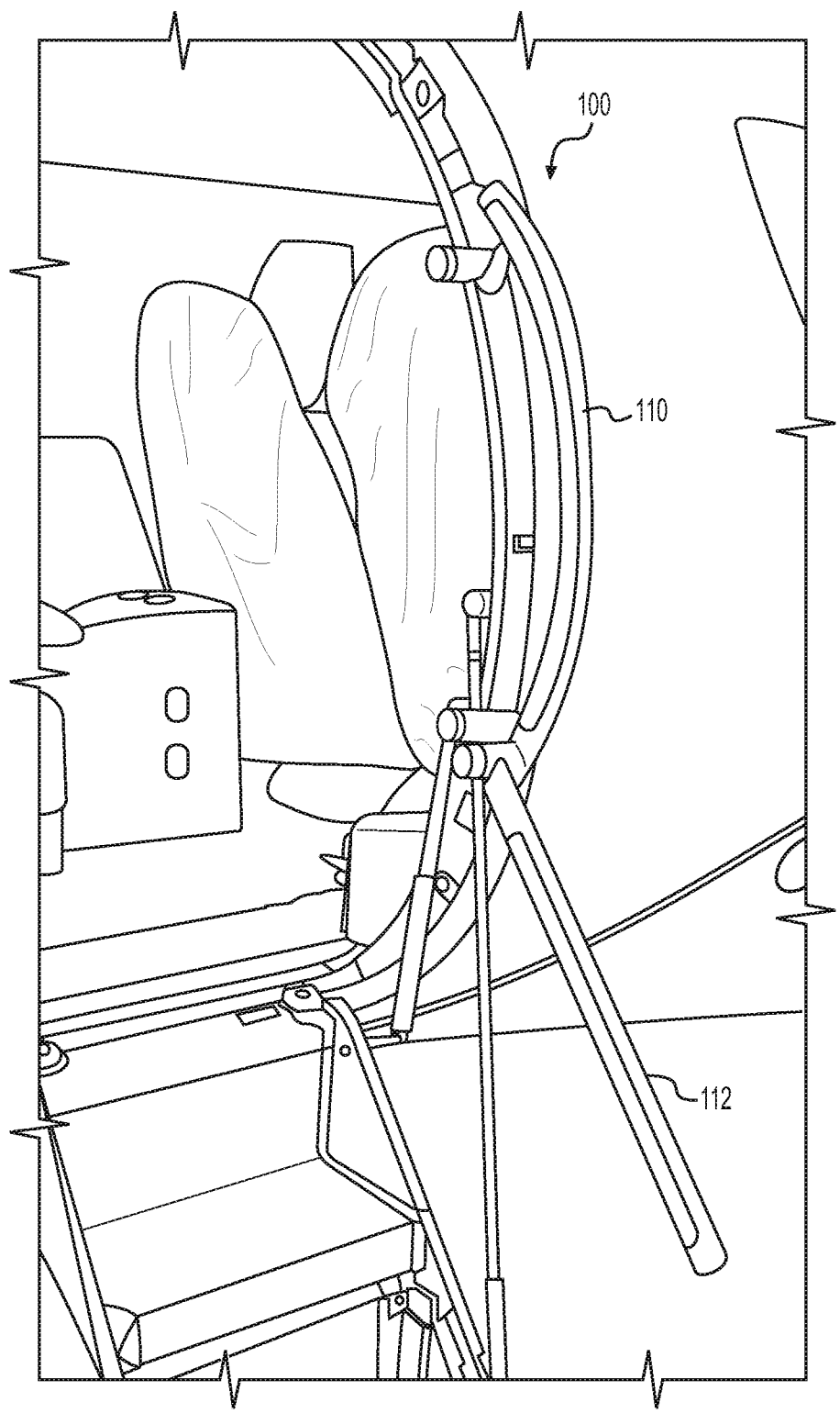
FIG. 3 is a perspective view of an aircraft door frame in which the handle system has been installed, and the handle is in a lowered and extended position.

An entry handle system 100 is installed into apertures 14 and 16 such that it is secured inside the inner edge 12 of the frame 10 as shown in FIGS. 2-3. System 100 includes a securement member 110, which in certain embodiments is a stationary member that conforms to a curvature of the inner door frame edge 12, and a handle 112, which in certain embodiments is a pivoting member that is pivotable between lockable positions. In FIG. 2, handle 112 is in an upright collapsed position (e.g., stowed) and in FIG. 3, handle 112 is in a lowered and extended position (e.g., deployed) such that handle 112 protrudes outside the aircraft doorway and downward over the aircraft stairs. After installation, the collapsed position shown in FIG. 2 is utilized when the handle is not needed. The extended position shown in FIG. 3, however, is used for example when a passenger needs additional assistance in boarding the aircraft. Securement member 110 includes mounting devices for mounting to apertures 14, 16 and a body portion that may serve as an additional handle for assisting a passenger boarding or deboarding the aircraft (e.g., when a passenger is at or near a top step of the stairs).

Figure 4:
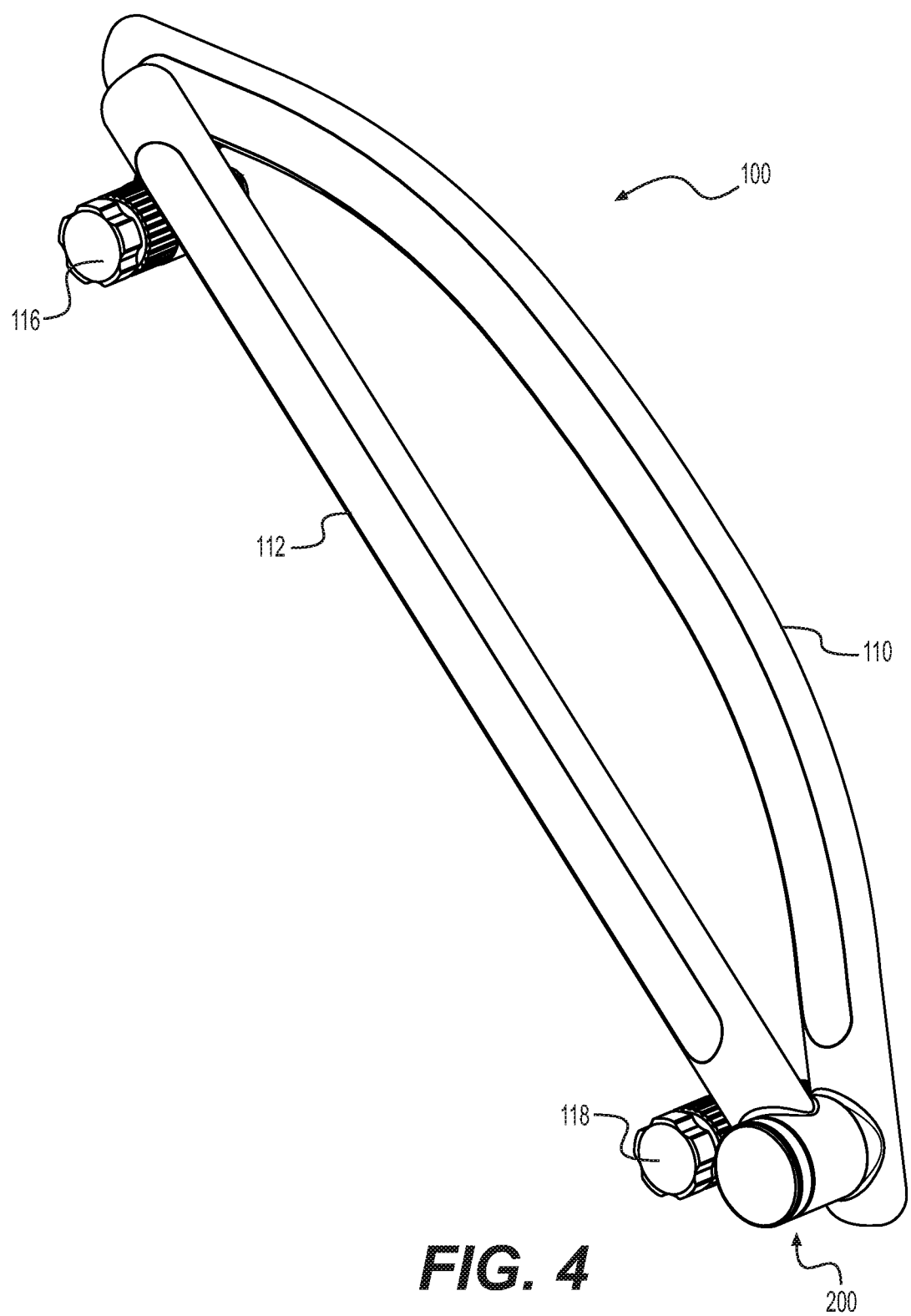
FIG. 4 is a is a perspective view of the handle system apart from the door frame before installation where the handle is in a collapsed position.
Figure 5:
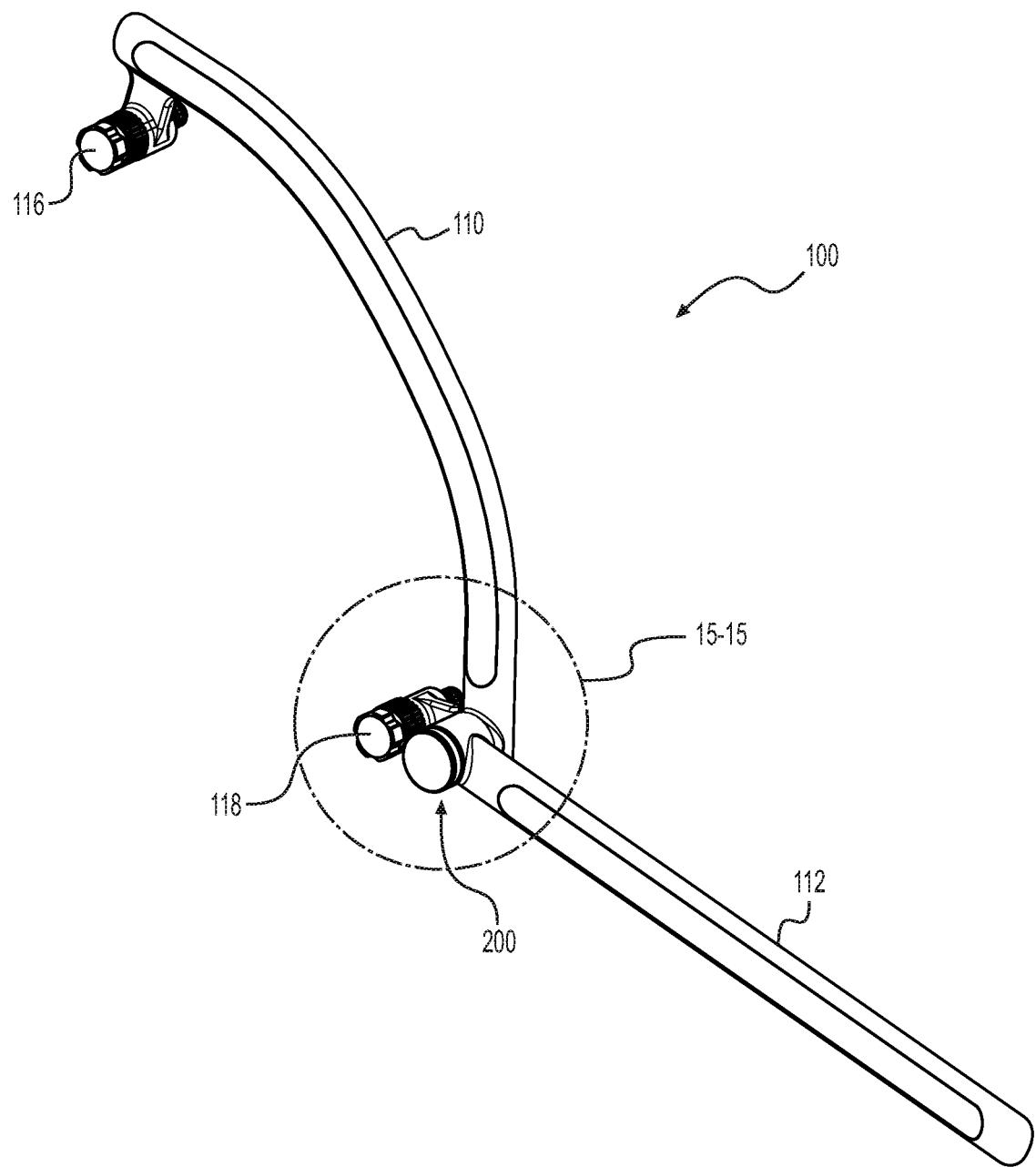
FIG. 5 is a perspective view of the handle system apart from the door frame before installation, and the handle is in an extended position.

FIGS. 4 and 5 show system 100 removed from the door frame in collapsed and extended positions, respectively. An upper mount 116 is used to fasten securement member 110 to upper aperture 14, and a lower mount 118 is used to fasten securement member 110 to lower aperture 16. Also shown in FIGS. 4 and 5 is a releasable locking feature 200 that pivotally couples securement member 110 with an end of handle 112.

Figure 6:
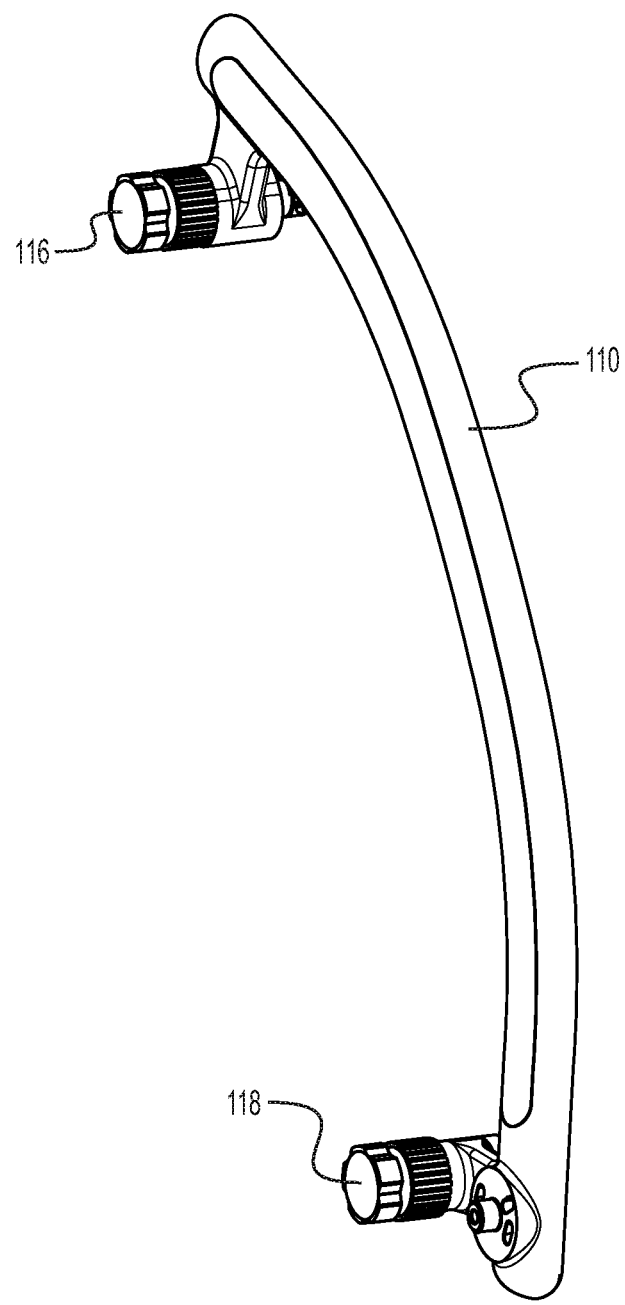
FIG. 6 shows the securement member of the system separated from the handle.
Figure 7:
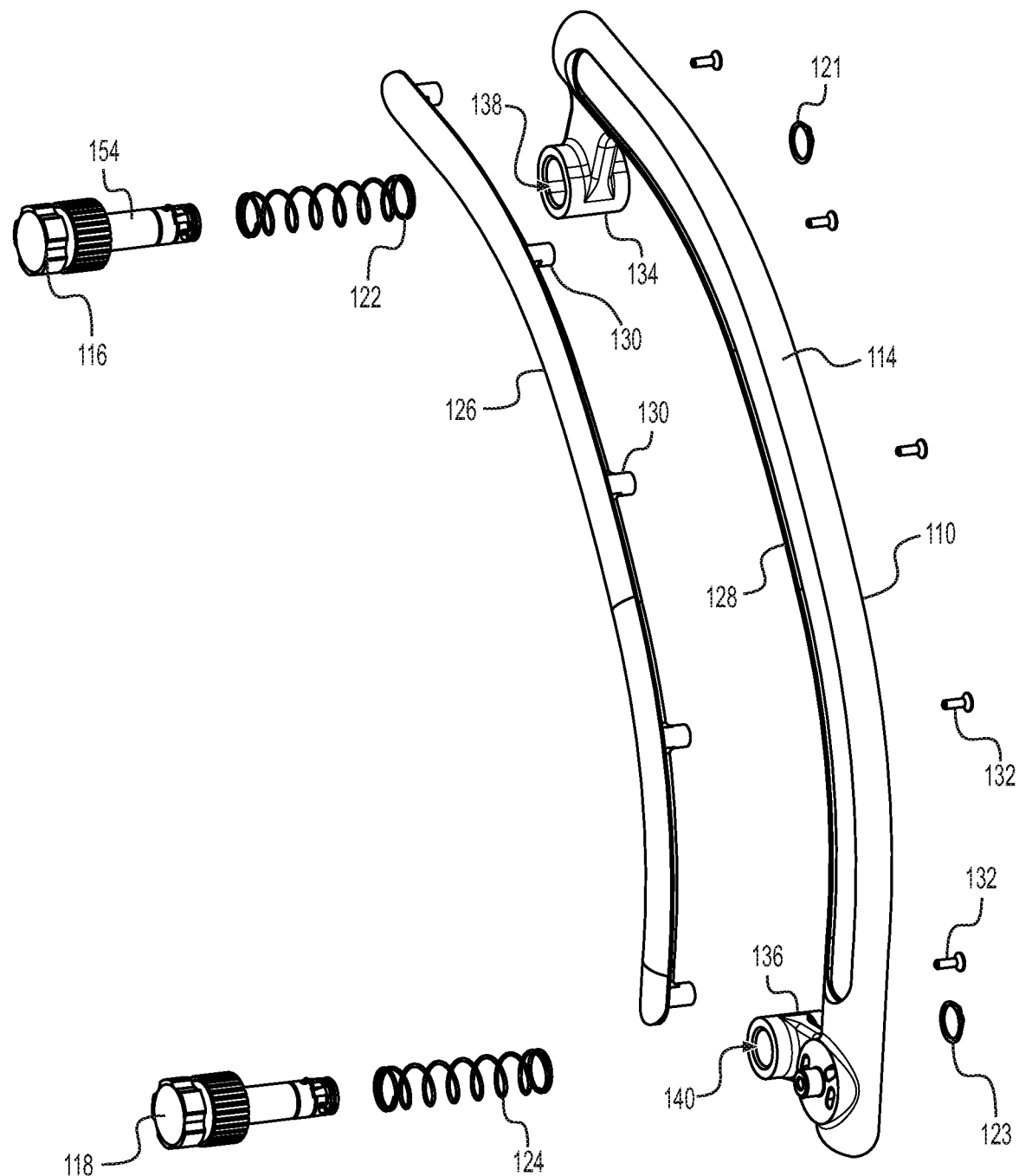
FIG. 7 shows an exploded view of the securement member assembly.

FIG. 6 shows the securement member 110 separated from handle 112. FIG. 7 shows an exploded view of the securement member 110 revealing numerous features of its assembly. An upper spring 122 and a lower spring 124 will be lightly compressed between the upper and lower mounts 116, 118, respectively, and held in place with a respective one of clips 121, 123.

Figure 8:
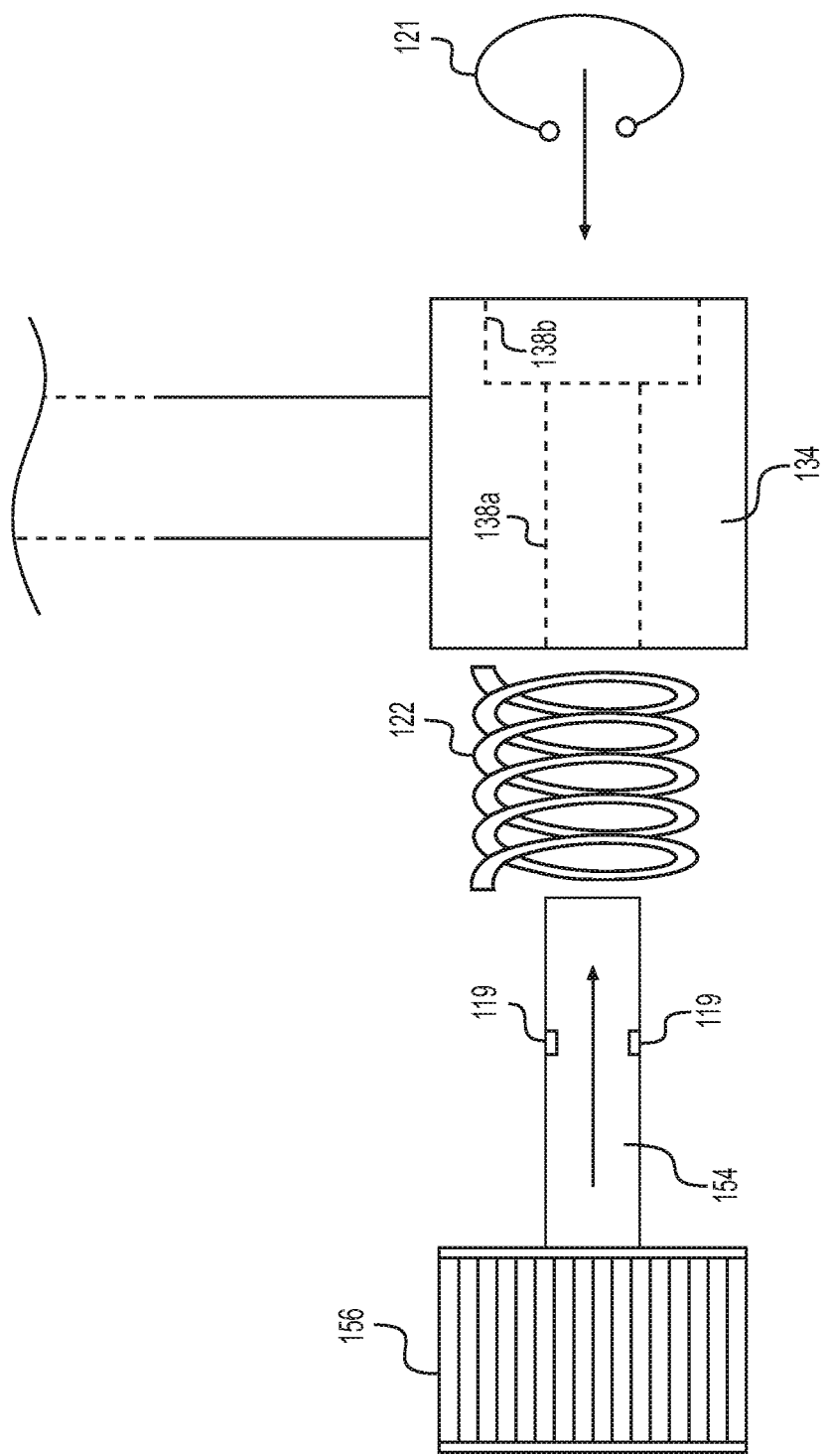
FIG. 8 shows a cross-sectional view of one of the securement member mounts.

For installation, each of springs 122 and 124 are slid onto a body 154 of the mount (see FIGS. 7-10), where each spring is received into a cylindrical coaxial space 155 created underneath a coaxial collar 156. The forward end 142 of the mount (see FIG. 9) is then passed through the relevant passageway (e.g., passageway 138 for mount 116, and passageway 140 for mount 118) with the spring on it, until the annular channel 119 is exposed in an enlarged bore area (e.g., see rear bore portion 138b, FIG. 8, which is diametrically larger than front bore portion 138a). A similar arrangement exists in passageway 140 where a forward bore portion has a larger diameter than a rearward bore portion. Thus, the front and rear bore portions 138a and 138b are formed into the backside of each of passageways 138 and 140. Once the annular channel 119 is exposed, the spring is pushed in so that a clip (e.g., clip 121 or 123) may be snapped onto body 154 and slid into place in annular channel 119. Clips 121, 123 may be C-clips (see e.g., FIG. 12A). Thus, upper mount 116 is held in place as shown in FIG. 6 by clip 121, and spring 122 biases upper mount 116 such that any play existing between the mount and the door frame aperture is minimized. Lower mount 118 is similarly held in place by clip 123 and biased via spring 124. Note that springs 122, 124 are optional features.

Although not specifically shown, in certain embodiments, upper passageway 138 has a substantially oval cross sectional shape, whereas the lower passageway 140 is substantially cylindrical. Other than this distinction, the attachment processes and mechanisms for lower mount 118 are the same as discussed above regarding upper mount 116.

A veneer trim 126 (see FIG. 7) is inserted to cover and enclose a front opening 128 to create an enclosed cavity within member 110. Trim 126 is secured in place using a plurality of fasteners 132 which are all received through holes (not shown) made into the back of the body 114. The fasteners (e.g., bolts) are received into internally threaded mounting posts 130.

In order to be secured in position, mounts 116 and 118 are received through upper 134 and lower 136 flanged collars. Passageways 138 and 140 are defined through collars 134 and 136, respectively. One of springs 122, 124 may be placed over body 154 and then inserted through the respective passageway 138, 140 and secured with one of clips 121, 123. Mounts 116 and 118 are secured into apertures 14 and 16, respectively, by rotating, as will be discussed in more detail below. When mounts 116, 118 are loosened by counter-rotating, springs 122, 124 are configured to push body 154 out of apertures 14, 16.

Figure 9:
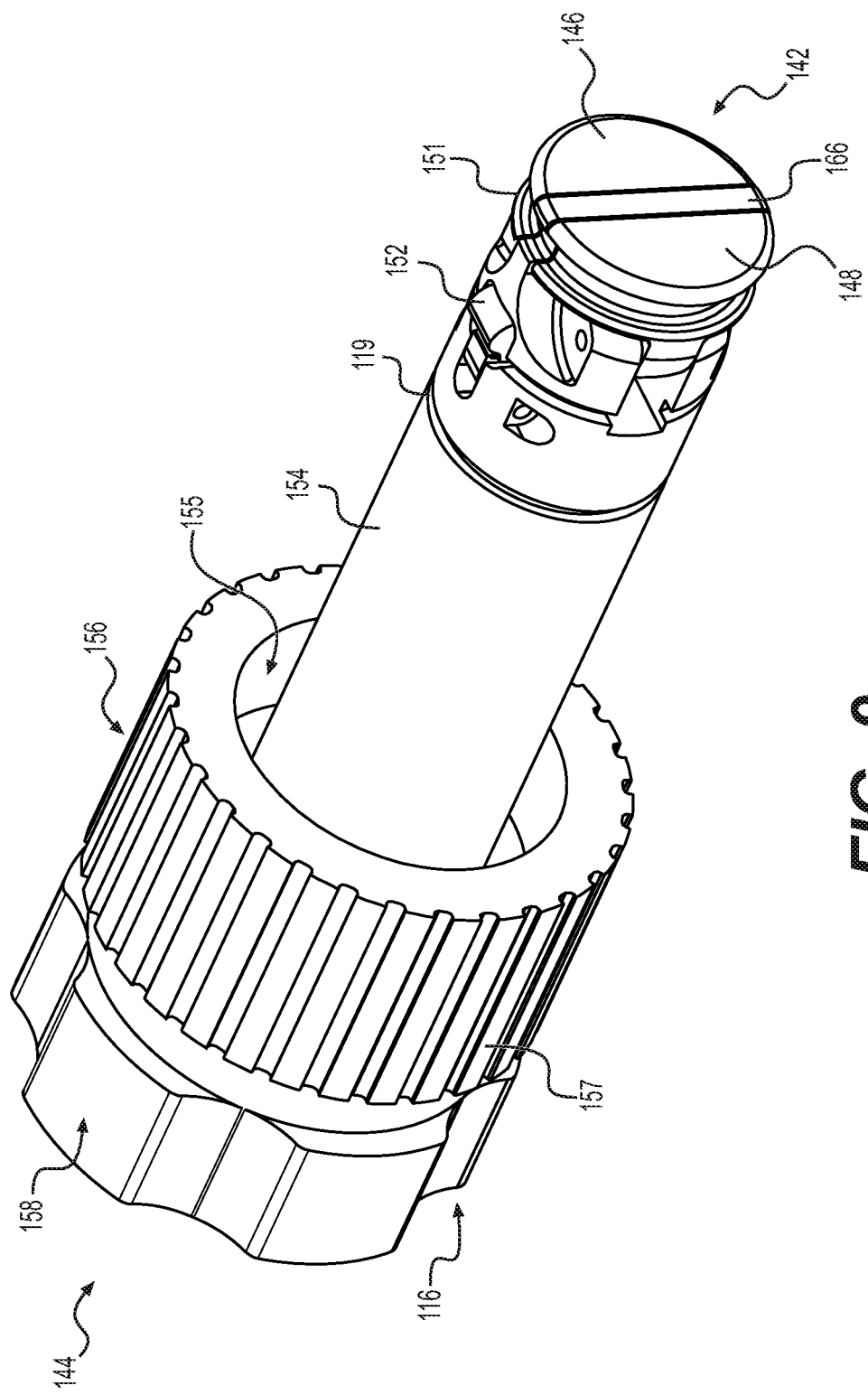
FIG. 9 shows a perspective view of one of the securement member mounts.

FIG. 9 shows mount 116 (in the disclosed embodiment, both of mounts 116 and 118 are identical, but in other embodiments similar, or even dissimilar mounting devices could be used) in isolation. Mount 116 has a front end 142 and a rear end 144. At the front end 142, two laterally extending fingers 146 and 148 (e.g., plates) are attached to either side of a central rib 166, and may be pivoted outwards to extend behind an internal surface of the door frame aperture (e.g., apertures 14 and 16) to secure mount 116 thereto. Fingers 146, 148 retract towards one another and against central rib 166 by, for example, an elastic rubber O-ring 150 (see FIGS. 12A, 12B and 13) that is received into a radial channel 151 defined into the exteriors of fingers 146, 148. Slightly further rearward, a kick-out foot 152 (see also FIG. 10) is hingeably attached such that it is caused to press against the internal surface of the door frame aperture (e.g., apertures 14 and 16). Foot 152, when so deployed, disallows lateral movement of body 154.

Further rearward, a coaxial collar 156 with longitudinally ribbed exterior surface 157 is fixed to the outside of the mount body 154. Ribbed exterior surface 157 provides the user with a graspable surface for turning coaxial collar 156 by hand. An actuating head 158 also includes a graspable surface that may be turned independently from coaxial collar 156 and body 154. Turning of coaxial collar 156 and actuating head 158 is described in more detail below in connection with FIG. 10.

Figure 10:
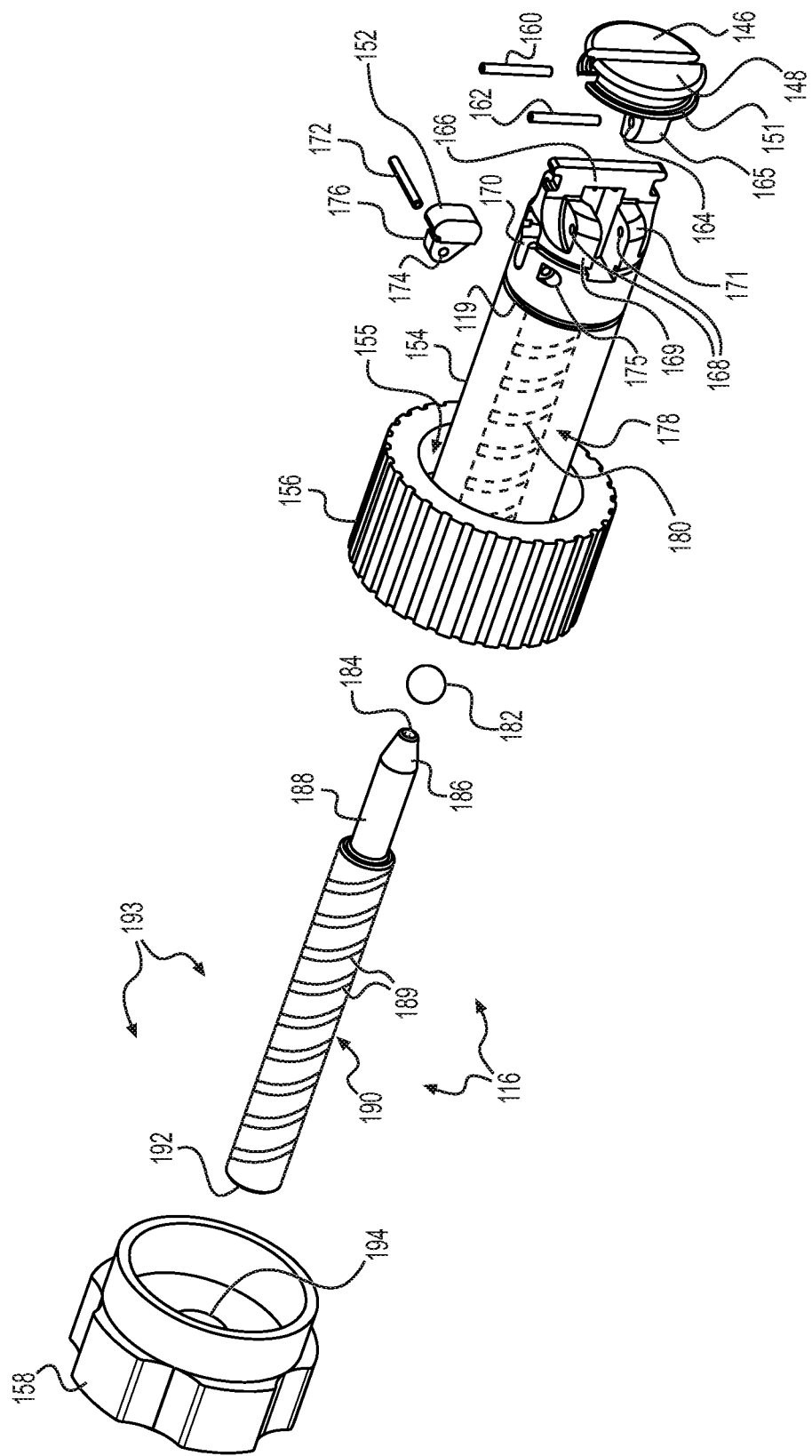
FIG. 10 shows an exploded view of one of the securement member mounts.

FIG. 10 shows an exploded view of upper mount 116 revealing internal components. A ball 182 is configured to propel fingers 146 and 148 outward upon actuation, and a forwardly tapered surface 186 is configured to propel kick-out foot 152 outward. Fingers 146, 148 and foot 152 press against the inner walls of door frame apertures (e.g., apertures 14 and 16) to secure mount 116 (and thus, the securement member 110 when both mounts are engaged) in place in door frame 10.

Pins 160 and 162 are used to hingeably secure fingers 146, 148, respectively. Pin 162 enters through a bore 164 which is defined through a backwardly extending flange 165 on the back of finger 148. Although not shown in FIG. 10, the arrangement behind finger 146 is, in this embodiment, symmetrical, meaning that the pin/bore/flange arrangement hingeably securing finger 146 is symmetrical with pin 162, bore 164, and flange 165. Sandwiching platforms 169 and 171 are configured on opposite sides of backwardly extending flange 165. A linear bore 168 is made through both of platforms 169 and 171 such that pin 162 can be received through it for securing finger 148 (e.g., pin 162 may be force fit through bore 168 and bore 164). Finger 146 is hinged in an arrangement symmetrical with finger 148 (although not visible in FIG. 10).

A recess 170 is configured to receive foot 152. A pin 172 passes through a bore 175 in body 154, as well as through a bore 174 in a flange 176 of foot 152. (Although not shown in FIG. 10, there is also a second bore made through the body 154 on the side opposite bore 175 for receiving the other end of pin 172). When pin 172 is fit through all these bores, foot 152 is hingeably secured in recess 170 and ready for action.

A longitudinal internal bore 178 is formed inside body 154. Bore 178 includes internal threads 180 which are configured to mate with reciprocating threads 189 on a ram pin 190. Ram pin 190 begins with a hollow point tip 184 that is adapted to receive and engage rigid ball 182. Behind the hollow point tip 184, ram pin 190 tapers backward (in a section 186) until it transitions into a cylindrical portion 188. Rearward of cylindrical portion 188, a threaded exterior portion 189 is formed, which is also substantially cylindrical and of slightly wider diameter than cylindrical portion 188. A rear end 192 of the pin is (unlike shown in the exploded view of FIG. 10) integral with (e.g., welded, epoxied, fastened, or otherwise fixed) to a receiving area 194 located in actuating head 158 to form a driver assembly 193.

Figure 11:
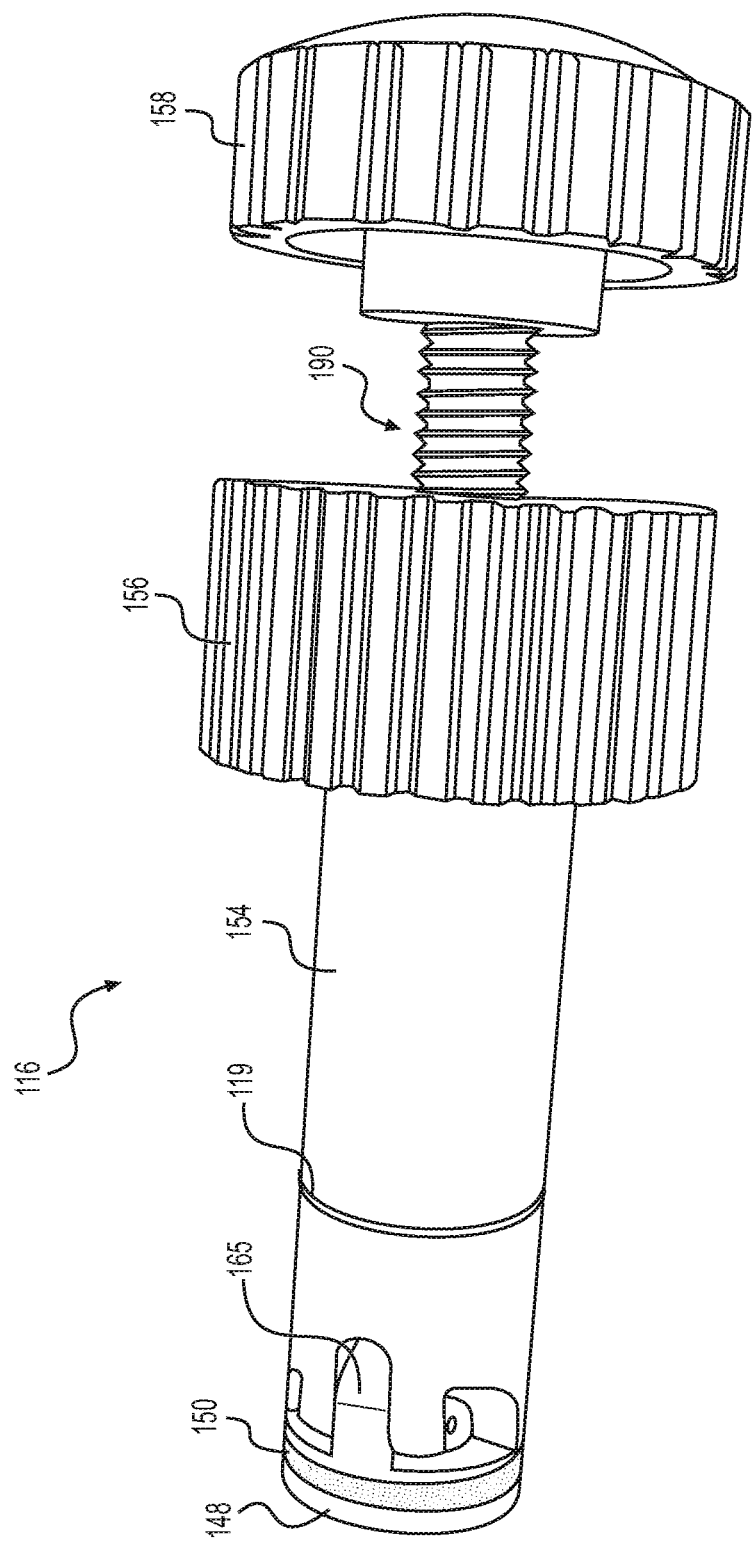
FIG. 11 shows another perspective view of one of the securement member mounts.

FIG. 11 shows a perspective view of securement mount 116 after having been assembled. FIG. 11 depicts finger 148, O-ring 150, flange 165, annular channel 119, body 154, coaxial collar 156, threaded exterior portion 189 of ram pin 190, and actuating head 158.

Figure 12A:
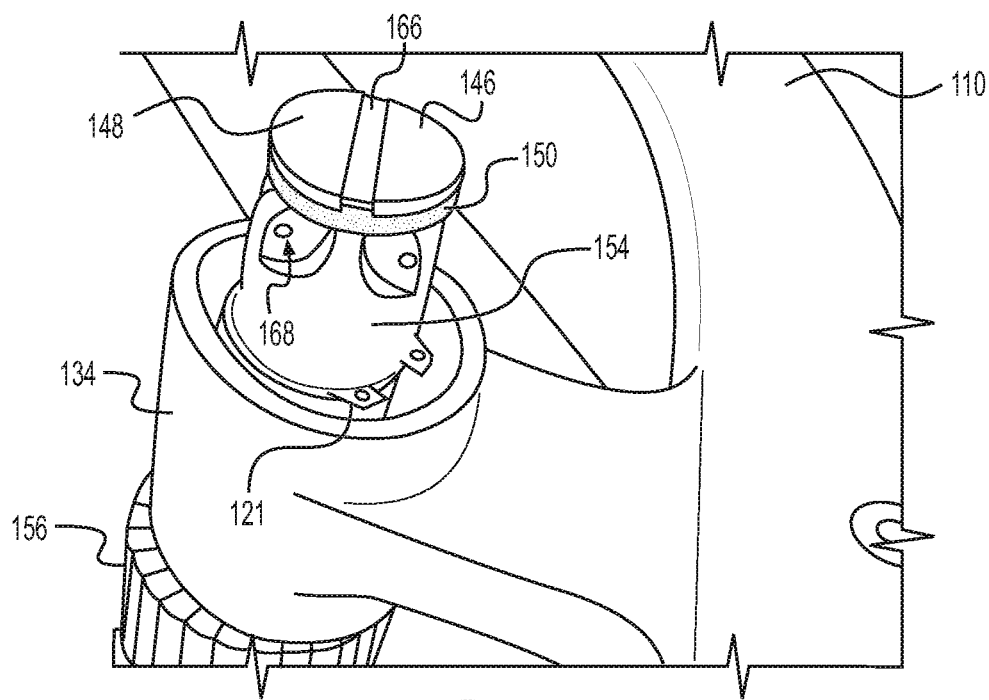
FIGS. 12A-B show perspective views of one of the securement member mounts positioned through a flanged collar.
Figure 12B:
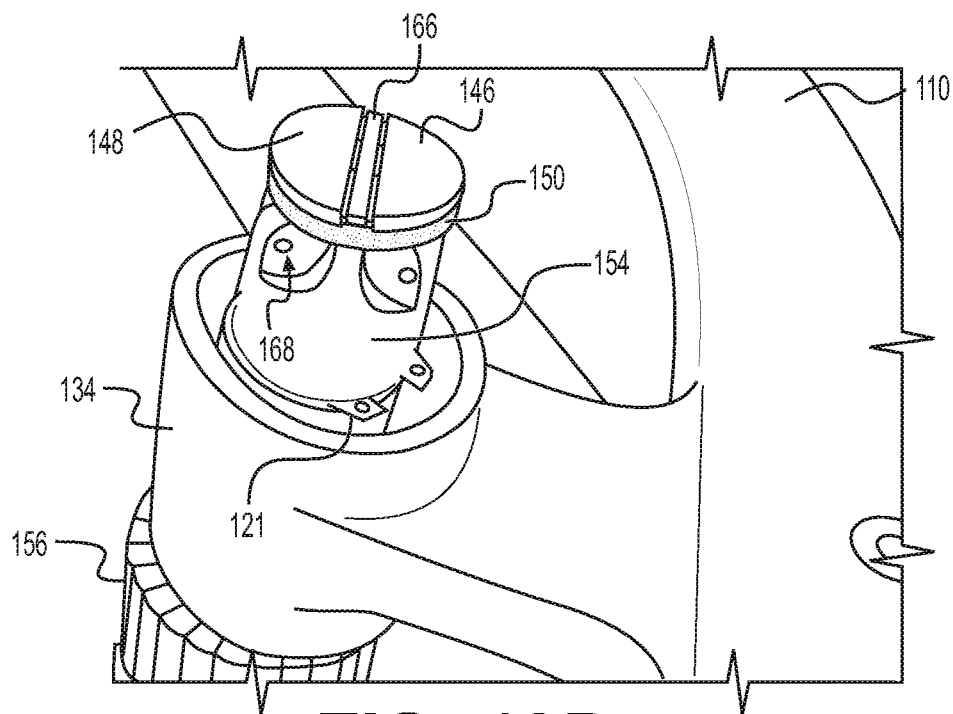

FIGS. 12A-B show perspective views of one of the securement member mounts positioned through a flanged collar (e.g., a collar attached to the securement member by a flange). For example, upper mount 116 is positioned through upper flanged collar 134. As depicted in FIG. 12A, fingers 146 and 148 are retracted against central bar 166 via O-ring 150. As depicted in FIG. 12B, fingers 146 and 148 are actuated to extend laterally, creating a gap adjacent both longitudinal edges of central bar 166. Clip 121 is visible about body 154 in FIG. 12A.

Figure 13:
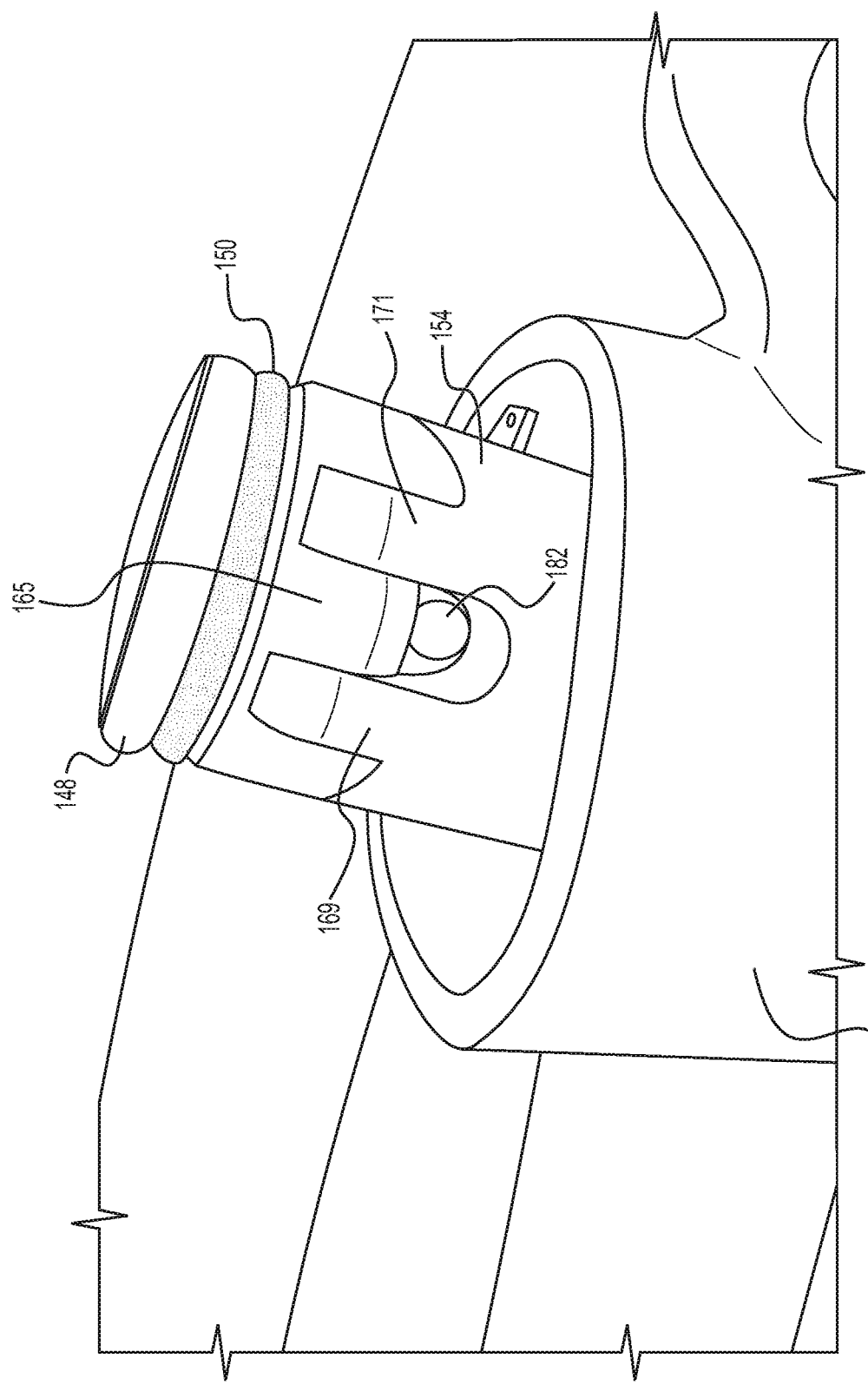
FIG. 13 another perspective view of one of the securement member mounts positioned through a flanged collar.

FIG. 13 is another perspective view of one of the securement member mounts positioned through flanged collar 134. A portion of ball 182 is depicted beneath flange 165.

Figure 14:
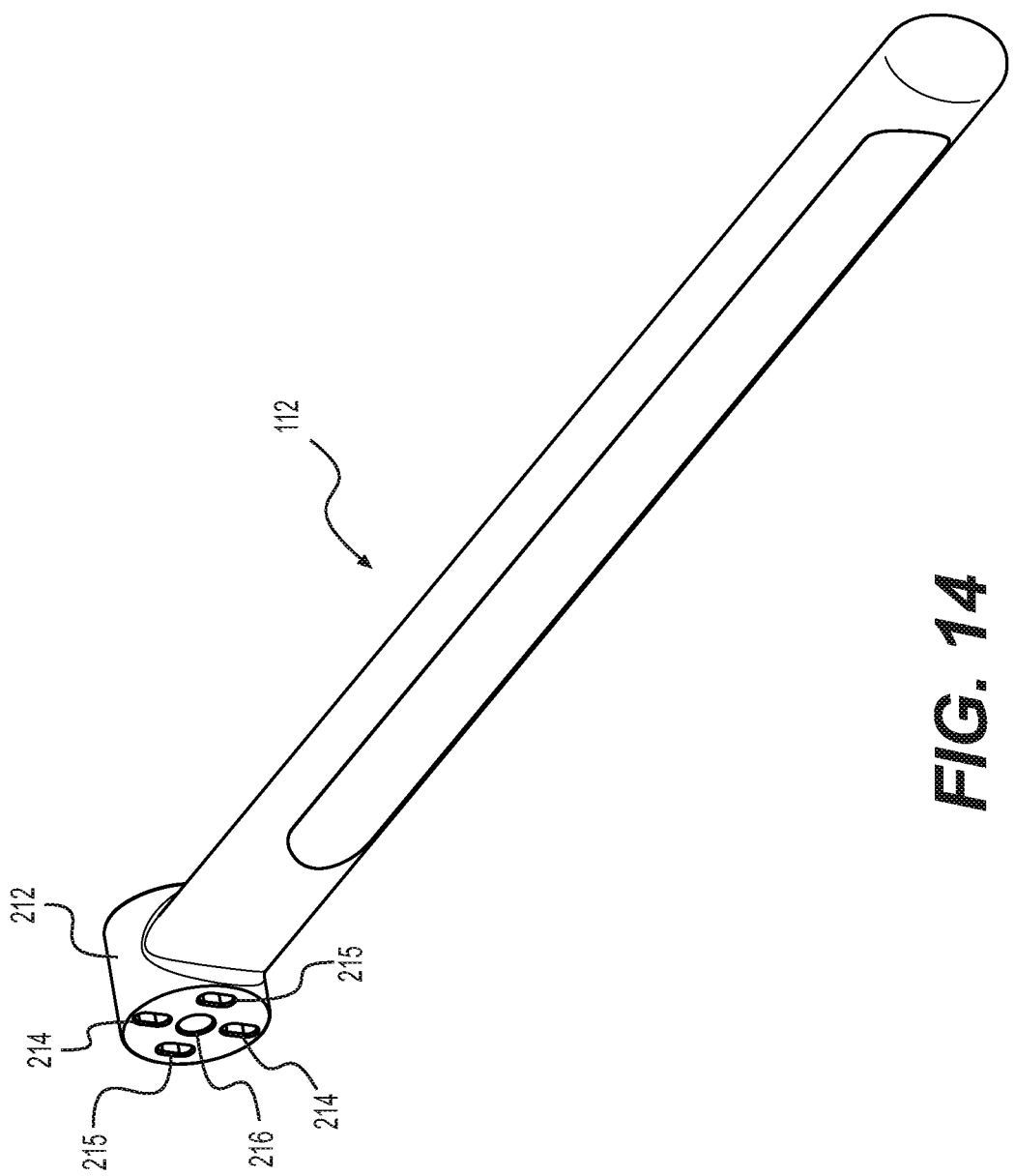
FIG. 14 shows the handle removed from the securement member.

FIG. 14 shows handle 112 removed from securement member 110. Four longitudinal slots are formed through a substantially solid hub 212. A first pair of slots 214 are positioned on opposite sides of an axial bore 216 located through the center of hub 212. A second pair of slots 215 are also positioned on opposite sides of axial bore 216. Slots 214, 215 are configured to receive legs of a legged actuator, as illustrated in FIG. 15.

Figure 15:
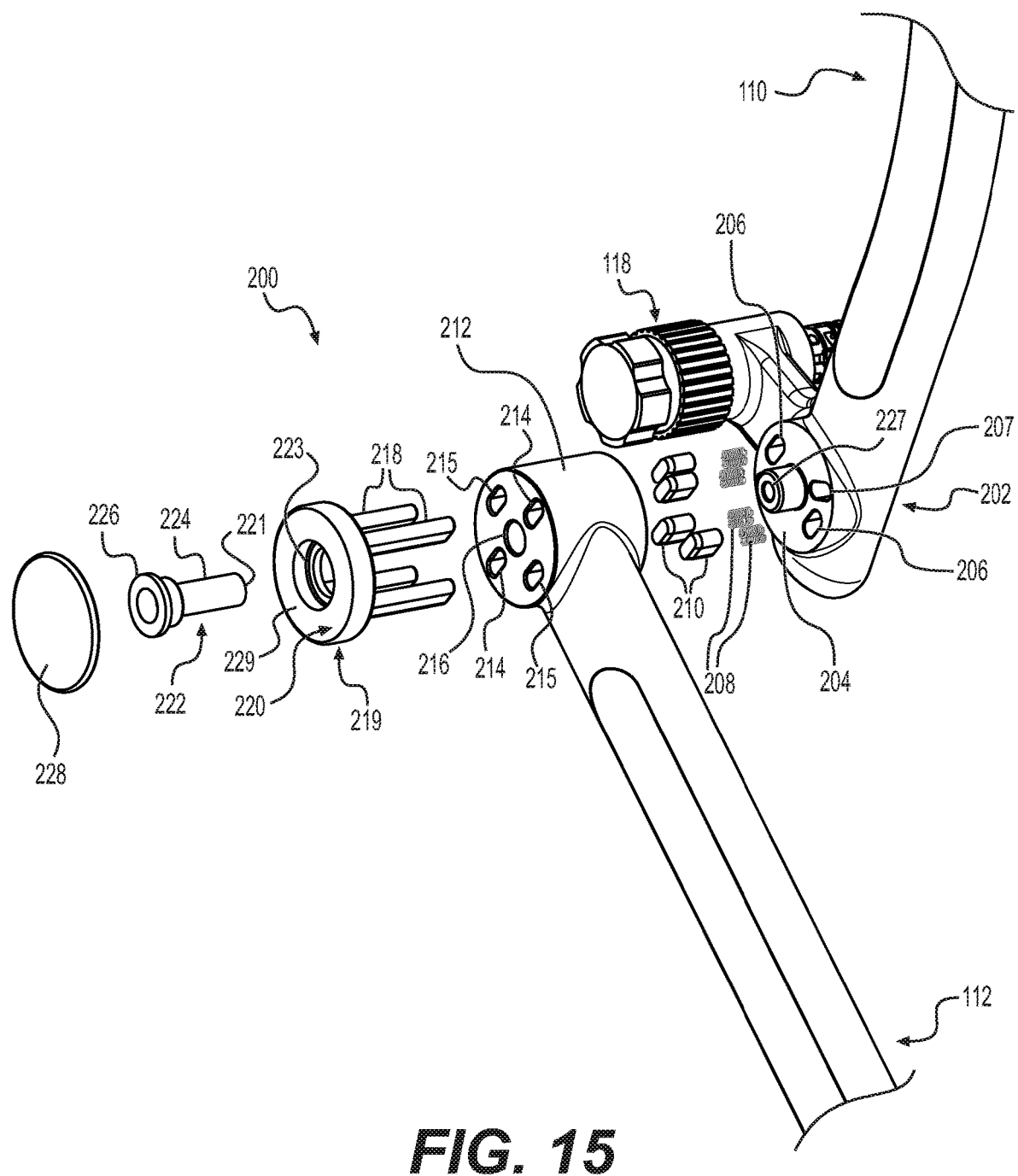
FIG. 15 shows an exploded of detail view 15-15 of the lockable pivot arrangement created where the handle and the securement member are connected.

FIG. 15 shows an exploded view, corresponding to detail 15-15 of FIG. 5, of the lockable pivot arrangement between handle 112 and securement member 110, which includes a releasable locking feature 200 for locking handle 112 in different orientations with respect to securement member 110. Near a lower portion 202 of securement member 110, an interface 204 enables a pivotal locking connection between handle 112 and lower portion 202 of securement member 110. Slots 214, 215 each receive one of four legs 218, all of which extend from a washer shaped head 220 to form a legged actuator 219, which may be actuated by a user via a button cap 228 for releasing handle 112 for pivoting.

Interface 204 includes a spud housing which includes a plurality of spud receptacles 206, 207 which are radially clocked about a raised axial outcropped portion 227, which has a central axial aperture. It should be noted that, in FIG. 15, one of the receptacles 207 is blocked by the outcropped portion 227. The receptacles 206, 207 each receive a respective spring 208 (e.g., a lee spring, a mechanical wire spring, a compression spring, a leaf spring, a gas spring) and a spud 210 on top of the spring. Spuds 210 are compelled by springs 208 out from receptacles 206, 207 against a base surface of a substantially solid hub 212. In other words, spuds 210 together with springs 208 form spring-loaded spuds.

Hub 212 also includes an axial bore 216 which is used to receive a body 224 of a securement pin 222. Securement pin 222 has a head 226 for abutting a recessed area 223 formed in a washer head 220 of the actuator 219, and a tail 221 for abutting outcropped portion 227. Note that springs 208 push actuator 219 outward. Button cap 228 is fixed to a flush surface 229 on the head 220 by any of welding, bonding, or some other method. In an embodiment, the internal threads in body 224 of securement pin 222 are adapted to receive reciprocating threads on an axle 225 (e.g., a bolt) that is received from behind and through a center axial aperture in outcropped portion 227 of interface 204 (see FIGS. 18A and 18B). Alternatively, securement pin 222 could be attached to outcropped portion 227 in some other manner (mating threaded arrangement, etc.). The length of pin body 224 and height of outcropped portion 227 are created such that button actuator 219 is normally displaced slightly away from handle hub 212 by springs 208. When button cap 228 is depressed, actuator legs 218 push spuds 210 into the receptacles 206, 207, thereby compressing springs 208 for releasing hub 212 and handle 112 for rotation. This enables handle 112 to be extended downward (e.g., deployed), or to be raised upward into a collapsed position (e.g., stowed). Receptacles 206, 207 are arranged in positions that allow for spuds 210 to lock into place for extending or collapsing handle 112.

Figure 16A:
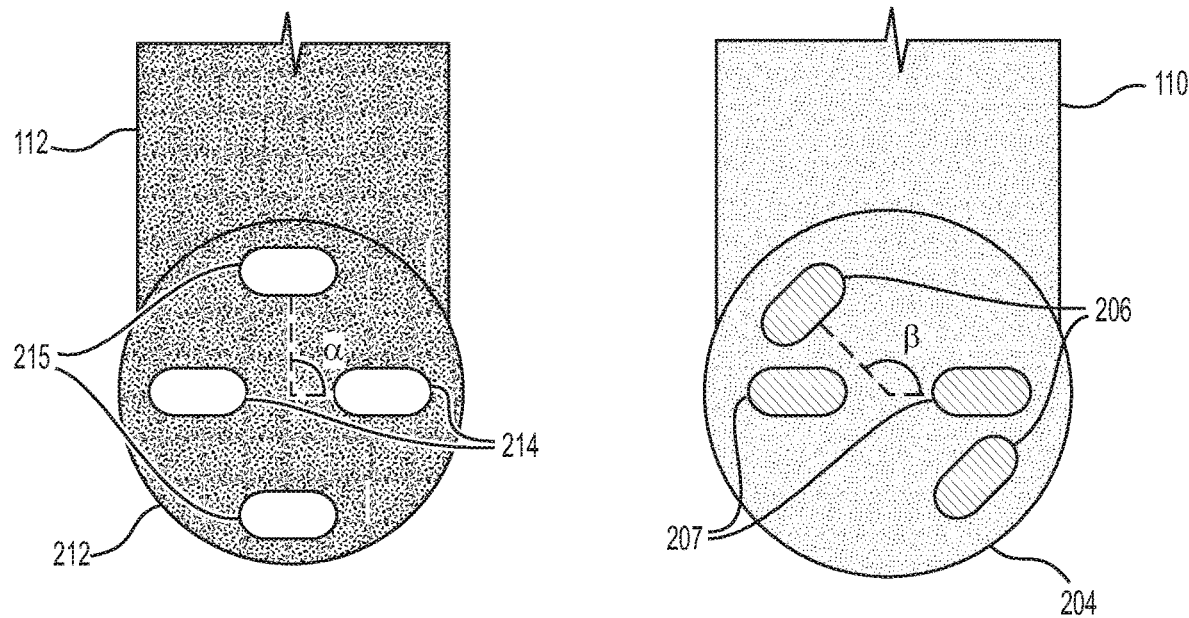
FIGS. 16A-B show the clocked relationship of the spud and actuator receptacles for the collapsed handle position.
Figure 16B:
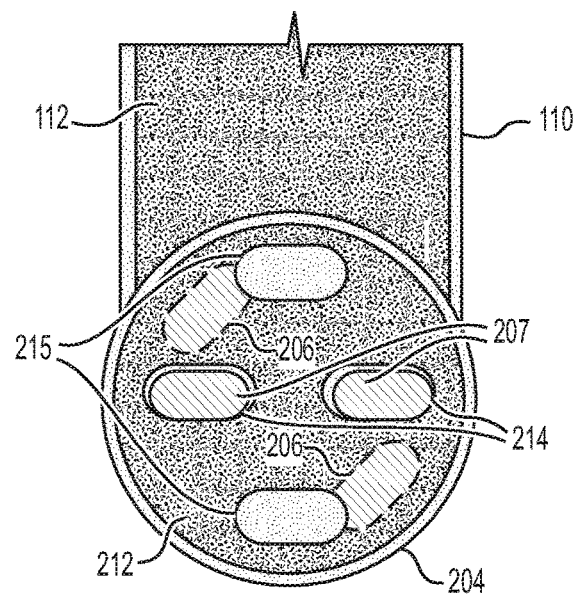
Figure 17A:
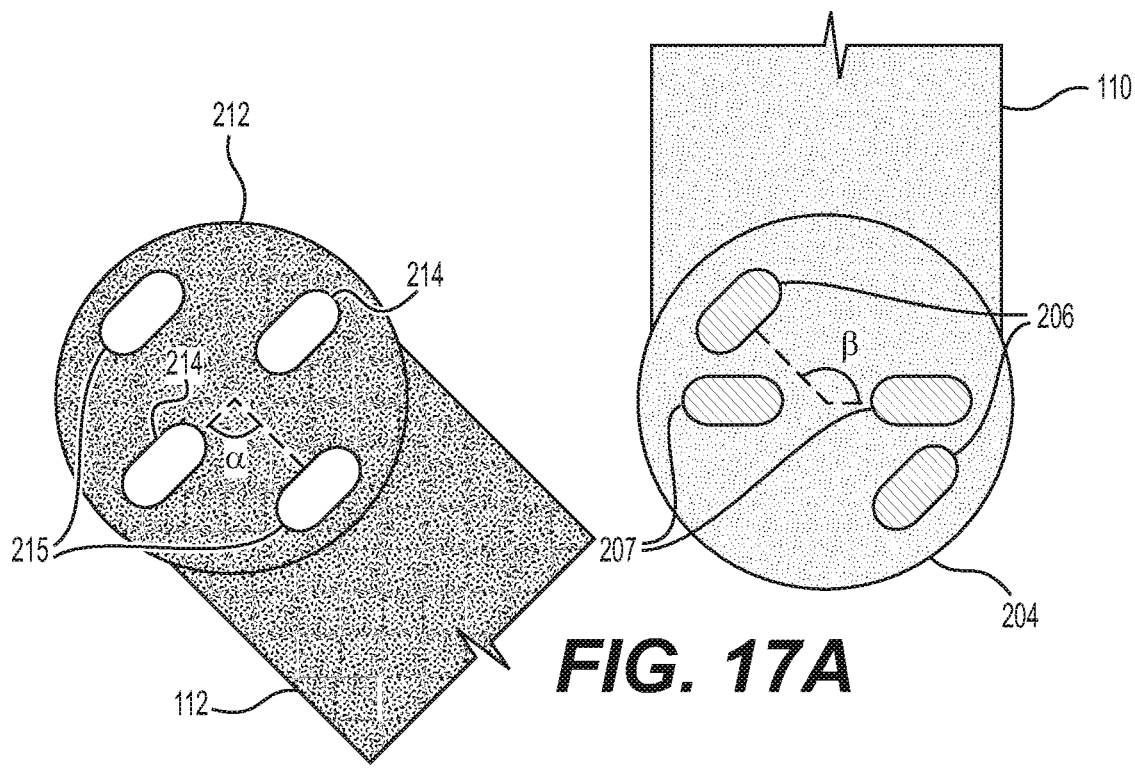
FIGS. 17A-B show the clocked relationship of the spud and actuator receptacles for the extended handle position.
Figure 17B:
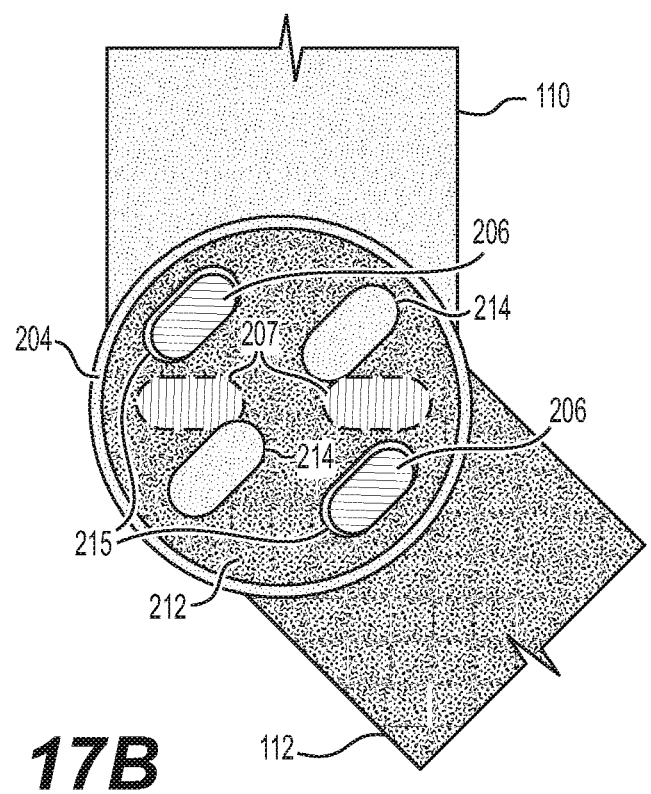

The orientations of receptacles 206, 207 and slots 214, 215 are shown separately in FIGS. 16A and 17A, and in overlapping relation to one another in FIGS. 16B and 17B for collapsed (e.g., stowed) and extended (e.g., deployed) positions of handle 112, respectively. Note that axial bore 216 is not depicted in FIGS. 16A-B and 17A-B for clarity of illustration. In FIG. 16A, handle 112 is depicted in the collapsed position and separately from securement member 110. Hub 212 of handle 112 includes the opposing pairs of slots 214 and 215, with slots 214 oriented relative to slots 215 by an angle α. Interface 204 of securement member 110 includes the opposing pairs of receptacles 206 and 207, with receptacles 206 oriented relative to receptacles 207 by an angle β, which is different than the angle α.

In embodiments, the angles between pairs of opposing slots (e.g., based on a center of each slot) are at an angle α relative to one another to create a desired locking arrangement. Similarly, the angle β between spud receptacle positions creates a desired locking position for handle 112. In more specific embodiments, angle α is about 90 degrees, and angle β is between about 120 degrees and about 135 degrees. One skilled in the art will recognize, however, that different slot and/or spud receptacle angular positions may be utilized to enable a variety of different handle-locking positions.

FIG. 16B depicts handle 112 and hub 212 in front of securement member 110 and interface 204, with handle 112 in the collapsed position. Slots 214 are aligned with receptacles 207, which enables spuds 210 to insert into slots 214 for locking handle 112 in the collapsed position (like in FIG. 4). Note that receptacles 206 (shown with dashed lines to indicate that they are not otherwise visible behind hub 212) are not aligned with slots 215 due to the difference between angles α and β.

In FIG. 17A, handle 112 is depicted in the extended position and separately from securement member 110, but otherwise the angles α and β are the same as in FIG. 16A. In FIG. 17B, handle 112 and hub 212 are depicted in front of securement member 110 and interface 204, with handle 112 in the extended position. Slots 215 are aligned with receptacles 206, which enables spuds 210 to insert into slots 215 for locking handles 112 in the extended position (like in FIG. 5). Note that receptacles 207 (shown with dashed lines to indicate that they are not otherwise visible behind hub 212) are not aligned with slots 214 due to the difference between angles α and β.

Figure 18A:
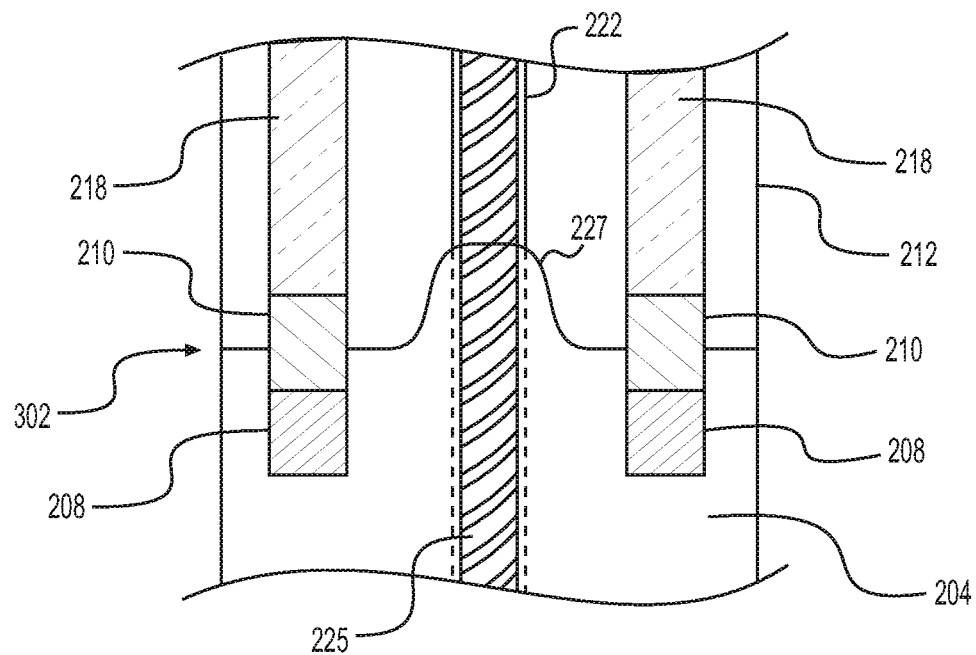
FIGS. 18A-B show cross sectional drawings at a pivot interface for locked and unlocked states of the handle.
Figure 18B:
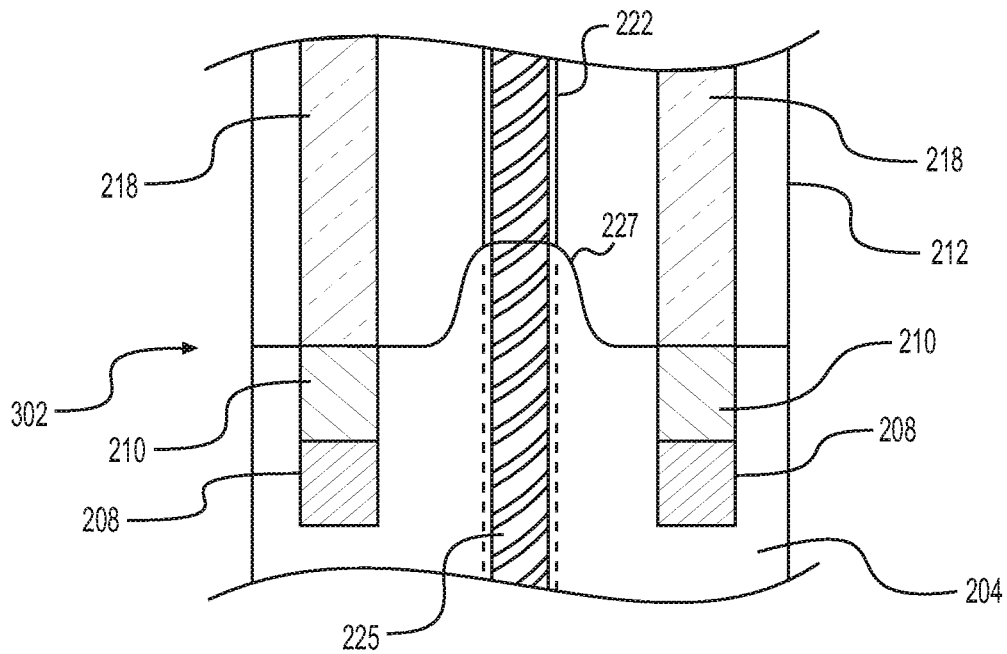

The way that spuds 210 are brought from a locked position, to a flush position that enables rotation of handle 112 is shown in the cross-sectional drawings in FIGS. 18A and 18B. For example, in the locked state shown in FIG. 18A, legs 218 of actuator 219 have not pushed spuds 210 downward, and therefore, springs 208 push spuds 210 up into slots 214 or 215 in hub 212. Thus, spuds 210 extend between both receptacles of interface 204 and slots of hub 212 to prevent rotation at a pivot interface 302. In FIG. 18B, actuator 219 has been depressed such that actuator legs 218 have pushed spuds 210 downward making their upper surfaces flush with pivot interface 302. This enables rotation between interface 204 and hub 212 because spuds 210 have not extended into the slots.

With these functional and structural understandings in mind, we are then able to understand how entry handle system 100 operates. It is presumed that handle 112 has already been attached to the securement member 110 as discussed above. That said, it may be preferred, pre-installation, to lock handle 112 into its collapsed position as shown in FIG. 4 (although it is possible to install the system in the expanded mode shown in FIG. 5). It is also presumed that the mounts 116 and 118 have each been assembled as shown in FIG. 9 (except that the O-ring 150, which is not shown in FIG. 9, would be installed into channel 151) and that trim 126 has been fastened on to the securement member body 114 using the bolts or other fasteners 132. Next, springs 122, 124 are optionally inserted through each of passageways 138 and 140.

Next, a user inserts a first mounting device (e.g., upper mount 116) through upper passageway 138. Optional spring 122 is secured to mounting body 154 of upper mount 116 by clamping clip 121 to annular channel 119. Upper mount 116 may then be secured into upper aperture 14 by turning actuating head 158 relative to coaxial collar 156. Ribbed exterior surface 157 enables the user to grasp coaxial collar 156 with one hand while turning actuating head 158 with the other hand to axially screw driver assembly 193 into internal bore 178 having internal threads 180, which are configured to mate with reciprocating threads 189 on ram pin 190. Ram pin 190 translates forward in mount body 154 pushing ball 182 where it engages the underside of foot 152 and the rear flanges of fingers 146 and 148 such that all of these components expand outwards to seat the first mount (e.g., upper mount 116) for securing one end of member 110 to upper door aperture 14.

Once upper mount 116 has been used to tie upper flanged collar 134 to upper aperture 14, a lower mount 118 may be installed in the same way to secure lower flanged collar 136 to lower aperture 16. Upon the completed installation of mounts 116 and 118 into apertures 14 and 16, securement member 110 is held firmly in place. It should be noted that it is also possible to attach lower mount 118 first (as a first mount), and later attach upper mount 116 (as a second mount).

Once securement member 110 is attached to inner edge 12 of door frame 10, as shown in FIG. 2, it may be expanded into the position shown in FIG. 3 by simply depressing the button cap 228 to move the components from the locked state shown in FIG. 18A into the released state shown in FIG. 18B as discussed above. Once lowered into the extended position (e.g., in FIG. 17B), handle 112 is returned to the locked state shown in FIG. 18A. A user may then use handle 112 to aid with cabin entry/exit via stairs.

Once entry handle system 100 is no longer useful (e.g., all occupants are on the aircraft, and it is time for takeoff), a user unlocks handle 112 by pushing button cap 228 and collapses handle 112 by raising it to the collapsed position where it is returned to the locked state. System 100 may then be removed from door frame 10 by releasing mounts 116 and 118 by counter-rotating actuating head 158. This causes fingers 146 and 148 and kick-out foot 152 for each mount to be retracted, enabling mounts 116 and 118 to be easily removed.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A removable handle for an aircraft doorway, comprising:
   a stationary member for mounting along an inner edge of the aircraft doorway;
   a mounting device configured for removably securing the stationary member to an existing aperture in the aircraft doorway;
   a pivoting member having a hub configured for rotating about an axle, wherein the axle is coupled to an interface of the stationary member such that the pivoting member pivots about the axle between a collapsed position adjacent the stationary member and an extended position protruding outside the aircraft doorway, wherein the interface comprises a first receptacle configured to house a first spring-loaded spud, and wherein the hub comprises a slot configured to receive the first spring-loaded spud, such that the first spring-loaded spud extends into the slot for locking the pivoting member in place when the first receptacle is aligned with the slot; and
   an actuator having a leg configured for inserting into the slot of the hub opposite the interface, wherein the leg is configured to push the first spring-loaded spud into the first receptacle upon actuation of the actuator thereby enabling unlocking the pivoting member for pivoting.

2. The removable handle of claim 1, wherein the stationary member is shaped with a curvature that matches the inner edge of the aircraft doorway.

3. The removable handle of claim 1, wherein the stationary member comprises a flanged collar for receiving the mounting device.

4. The removable handle of claim 1, further comprising a second receptacle configured to house a second spring-loaded spud, the second receptacle being oriented in the interface for aligning the pivoting member in the extended position such that the second spring-loaded spud extends into the slot for locking the pivoting member in place when the second receptacle is aligned with the slot.

5. A removable handle for an aircraft doorway, comprising:
a stationary member for mounting along an inner edge of the aircraft doorway;
a mounting device configured for removably securing the stationary member to an existing aperture in the aircraft doorway;
a pivoting member having a hub configured for rotating about an axle, wherein the axle is coupled to an interface of the stationary member such that the pivoting member pivots about the axle between a collapsed position adjacent the stationary member and an extended position protruding outside the aircraft doorway; and
wherein the mounting device comprises a first end having a pair of laterally extending plates configured for inserting into an inner portion of the existing aperture and a second end having an actuating head configured for driving a ram pin to deploy the laterally extending plates.

6. A removable handle for an aircraft doorway, comprising:
a stationary member for mounting along an inner edge of the aircraft doorway;
a mounting device configured for removably securing the stationary member to an existing aperture in the aircraft doorway;
a pivoting member having a hub configured for rotating about an axle, wherein the axle is coupled to an interface of the stationary member such that the pivoting member pivots about the axle between a collapsed position adjacent the stationary member and an extended position protruding outside the aircraft doorway; and
a kick-out foot hingeably attached to the mounting device for pressing against an outer portion of the existing aperture upon actuation by the actuating head to prevent lateral movement of the mounting device.

7. An entry handle for an aircraft doorway, comprising:
a stationary member having an axle housed in an interface, the stationary member being removably secured to the aircraft doorway via a mounting device coupled to an aperture of the aircraft doorway;
the mounting device having a first end with a pair of laterally extending plates configured for inserting into an inner portion of the aperture, and a second end having an actuating head configured for driving a ram pin to deploy the laterally extending plates; and
a pivoting member having a hub configured to receive the axle such that the pivoting member may pivot about the axle from a collapsed position to an extended position.

8. The entry handle of claim 7, wherein the interface comprises a first pair of receptacles aligned on opposing sides of the axle, and a second pair of receptacles aligned on opposing sides of the axle such that the first pair of receptacles is oriented relative to the second pair of receptacles by a first angle, and the receptacles are configured to house spring-loaded spuds.

9. The entry handle of claim 8, wherein the hub comprises a first pair of slots aligned on opposing sides of the axle, and a second pair of slots aligned on opposing sides of the axle such that the first pair of slots is oriented relative to the second pair of slots by a second angle, the second angle being different from the first angle, such that the slots are configured to receive the spring-loaded spuds for locking the pivoting member.

10. The entry handle of claim 9, wherein the first pair of receptacles aligns with the first pair of slots for receiving the spring-loaded spuds to lock the pivoting member when oriented in the collapsed position, and the second pair of receptacles aligns with the second pair of slots for receiving the spring-loaded spuds to lock the pivoting member when oriented in the extended position.

* * * * *